US011303511B2

(12) United States Patent
Shah et al.

(10) Patent No.: US 11,303,511 B2
(45) Date of Patent: Apr. 12, 2022

(54) BOOT SERVER SUPPORT IN AN ENTERPRISE FABRIC NETWORK (71) Applicant: Cisco Technology, Inc., San Jose, CA (US)

(72) Inventors: Parthiv Shah, Fremont, CA (US); Prakash C. Jain, Fremont, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 17/004,639

(22) Filed: Aug. 27, 2020

(65) Prior Publication Data

US 2022/0070276 A1 Mar. 3, 2022

(51) Int. Cl.
*H04L 12/24* (2006.01)
*H04L 29/12* (2006.01)
*H04L 29/08* (2006.01)
*H04L 12/66* (2006.01)
*H04L 41/0806* (2022.01)
*H04L 67/00* (2022.01)
*H04L 67/51* (2022.01)
(Continued)

(52) U.S. Cl.
CPC ......... *H04L 41/0806* (2013.01); *H04L 12/66* (2013.01); *H04L 41/0816* (2013.01); *H04L 61/2015* (2013.01); *H04L 67/16* (2013.01); *H04L 67/2814* (2013.01); *H04L 67/2876* (2013.01); *H04L 67/34* (2013.01); *H04L 2212/00* (2013.01)

(58) Field of Classification Search
CPC ......... H04L 7/00; H04L 7/0004; H04L 12/00; H04L 12/66; H04L 41/00; H04L 41/08–0806; H04L 41/0816; H04L 61/00; H04L 61/20; H04L 61/2007; H04L 61/2015; H04L 67/00; H04L 67/16; H04L 67/28; H04L 67/2814; H04L 67/2866; H04L 67/2876; H04L 67/34; H04L 2212/00
See application file for complete search history.

(56) References Cited

U.S. PATENT DOCUMENTS

6,202,091 B1 * 3/2001 Godse .................. G06F 9/4408
709/220
6,871,210 B1 * 3/2005 Subramanian .......... H04L 29/06
709/200
(Continued)

*Primary Examiner* — Boris D Grijalva Lobos
(74) *Attorney, Agent, or Firm* — Merchant & Gould P.C.

(57) ABSTRACT

Boot server support in an enterprise fabric network may be provided. A border device may forward, to a configuration server, a discovery message associated with a client device and the border device may forward, to a pre-boot server, the discovery message associated with a client device. The border device may then encapsulate, in response to receiving a reply to the discovery message from the configuration server and in response to receiving a reply to the discovery message from the pre-boot server, the reply to the discovery message from the pre-boot server using a Routing Locator (RLOC) from the reply to the discovery message from the configuration server. The encapsulated reply to the discovery message from the pre-boot server may include boot information. The border device may then forward the encapsulated reply to the discovery message from the pre-boot server to an edge device associated with the client device.

20 Claims, 4 Drawing Sheets (51) Int. Cl.
*H04L 67/2876* (2022.01)
*H04L 67/563* (2022.01)
*H04L 61/5014* (2022.01)
*H04L 41/0816* (2022.01)

(56) References Cited

U.S. PATENT DOCUMENTS

| | | | |
|---|---|---|---|
| 7,290,258 B2* | 10/2007 | Steeb | G06F 8/60 |
| | | | 717/168 |
| 2017/0026417 A1* | 1/2017 | Ermagan | H04L 63/0272 |
| 2020/0162330 A1* | 5/2020 | Vadapalli | H04W 12/30 |
| 2020/0264893 A1 | 8/2020 | Manjunatha et al. | |

* cited by examiner

BOOT SERVER SUPPORT IN AN ENTERPRISE FABRIC NETWORK

TECHNICAL FIELD

The present disclosure relates generally to providing boot server support and a Pre-Boot Execution (PXE) boot server for Power over Ethernet (PoE) and Internet-of-Things (IoT) devices using PXE boot support in an enterprise fabric network.

BACKGROUND

A computer network or data network is a telecommunications network that allows computers to exchange data. In computer networks, networked computing devices exchange data with each other using a data link. The connections between nodes are established using either cable media or wireless media. The best-known computer network is the Internet.

Network computer devices that originate, route, and terminate the data are called network nodes. Nodes can include hosts such as personal computers, phones, servers as well as networking hardware. Two such devices can be said to be networked together when one device is able to exchange information with the other device, whether or not they have a direct connection to each other. Computer networks differ in the transmission medium used to carry their signals, the communications protocols to organize network traffic, the network's size, topology, and organizational intent.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Boot server support in an enterprise fabric network may be provided. A border device may forward, to a configuration server, a discovery message associated with a client device and the border device may forward, to a pre-boot server, the discovery message associated with a client device. The border device may then encapsulate, in response to receiving a reply to the discovery message from the configuration server and in response to receiving a reply to the discovery message from the pre-boot server, the reply to the discovery message from the pre-boot server using a Routing Locator (RLOC) from the reply to the discovery message from the configuration server. The encapsulated reply to the discovery message from the pre-boot server may include boot information. The border device may then forward the encapsulated reply to the discovery message from the pre-boot server to an edge device associated with the client device.

Both the foregoing overview and the following example embodiments are examples and explanatory only, and should not be considered to restrict the disclosure's scope, as described and claimed. Furthermore, features and/or variations may be provided in addition to those described. For example, embodiments of the disclosure may be directed to various feature combinations and sub-combinations described in the example embodiments.

EXAMPLE EMBODIMENTS

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

A fabric network may comprise a network topology in which components pass data to each other through interconnecting network nodes (e.g., devices). Fabric networks comprise overlay and underlay. The underlay deals with connectivity between fabric network devices and the overlay deals with user traffic transiting the fabric network. The fabric network overlay may comprise functional components such as Fabric Edge (FE) devices, fabric intermediate devices, Fabric Border (FB) devices, and a map resolver/server.

In the fabric network overlay, FE devices may comprise, for example, Locator/ID Separation Protocol (LISP) xTR (Ingress/Egress Tunnel Router)/PxTR (Proxy xTR) nodes and FB devices may comprise, for example, LISP PxTR (Proxy xTR) nodes. End points (e.g., client devices or hosts) may be attached to the FE devices. The end points may be in Endpoint Identification (EID) space where each endpoint may have an EID. Each device in the fabric network (e.g., FE devices and FB devices) may be configured with an address (e.g., a locator address). FE devices may register discovered EIDs (from the end points) with a fabric host-tracking database running on the map resolver/server associating the discovered EID to, for example, the configured locator address of the FE device that discovered it.

When a local FE device receives a packet from a local end point destined to a remote end point (i.e., on a remote FE device) whose location is not known, the local FE device may send a map request message to the map resolver/server. Once the local FE device receives a reply message back from the map resolver/server associating the unknown EID to the remote locator address, all subsequent traffic from the local end point may be encapsulated (e.g., LISP encapsulated) and forwarded to the remote locator address (i.e., remote FE device). Once the encapsulated packet is received on the remote FE device, the remote FE device may decapsulate the packet and forward natively (e.g., to the remote endpoint).

FB devices may connect the fabric network to the native routing domain. FB devices may be configured, for example, as LISP PxTR nodes and may provide a default gateway service to the FE nodes. Communication may happen through the FB device configured, for example, as a LISP PxTR node. When an FE device receives a packet from a local end point destined to a host outside the fabric network in the native routing domain, the FE device may encapsulate and send the packet to the FB device. The FB device may provide, for example, the LISP PxTR functionality and advertise itself as a next-hop address for all the fabric managed EID prefixes to the native routing domain so that it can steer the traffic.

Fabric overlay may provide the following services. For example, fabric overlay may provide stretched Layer-2 service using Layer-3 overlay, which may provide the flexibility of extending a subnet to any part of the fabric network. For example, a subnet may be present across multiple FE devices with the same anycast gateway Internet Protocol (IP) address to allow for roaming by allowing endpoints to continue using the same gateway IP address. The provided services may also include Layer-3 overlay service and built-in mobility.

A Pre-Boot Execution Environment (PXE) may allow client devices (e.g., hosts or endpoints) to boot from a server prior to booting using their own Operating System (OS). PXE-enabled client devices may be physically connected to a network even when they are not booted up. A network administrator may not need to physically visit a PXE-enabled client device to manually boot the PXE-enabled client device because operating systems and other diagnostic programs may be loaded onto the PXE-enabled client device from a server over the network.

Dynamic Host Configuration Protocol (DHCP) may comprise a client/server protocol that may automatically provide an Internet Protocol (IP) host with its IP address and other related configuration information such as a subnet mask and a default gateway so that it may communicate with other IP networks. DHCP Option-82 may provide additional security when DHCP is used to allocate network addresses. It may enable the controller to act as a DHCP relay agent to prevent DHCP client requests from untrusted sources. DHCP Option-60 may be used to define a Vendor Class Identifier (VCI) on the DHCP server and may be used by DHCP client devices to identify themselves to the DHCP server. DHCP Option-67 may provide a client device a path to a file that may be retrieved and used to boot from a Trivial File Transfer Protocol (TFTP) server. IP addresses of a list of TFTP servers may be provided by DHCP Option-66.

The aforementioned PXE boot functionality may be implemented by: i) having a DHCP server that may also have Option-60 support with a PXE server's name and boot file information so that client devices may communicate to it while coming up to get PXE boot information and DHCP addresses at the same time; and ii) two different servers (e.g., helpers) configured in the network, one for DHCP address assignment and other for PXE boot information.

In an overlay enterprise fabric deployment, it may be difficult to support PXE boot functionality because the DHCP process may rely on Option-82 added by a Relay Agent (e.g., a Fabric Edge node in a Software-Defined Access (SDA) environment). In addition to the Relay Agent adding Option-82, it may also be important for the DHCP server to send an offer back with Option-82 information added. This may be because a border node may extract the Routing Locator (RLOC) and Circuit ID (e.g., Virtual Network Identifier (VNI) or Interface Identifier (IID)) information from an offer packet to send it back to a correct edge node over the fabric to deliver to the client device. Consequently, PXE boot servers in the network with DHCP support may not include Option-82 in the response. If the DHCP offer comes without Option-82, then the border node may not know which RLOC/VNI the packet needs to be sent to and the border node may drop the packet. This may break the DHCP functionality in fabric environments that may have the PXE boot capabilities.

In SDA deployments, many such specific use cases may have failed because Option-82 may not be relayed back by servers that may have PXE boot capabilities. Consequently, embodiments of the discourse may provide PXE boot capabilities during DHCP assignment.

Figure 1:
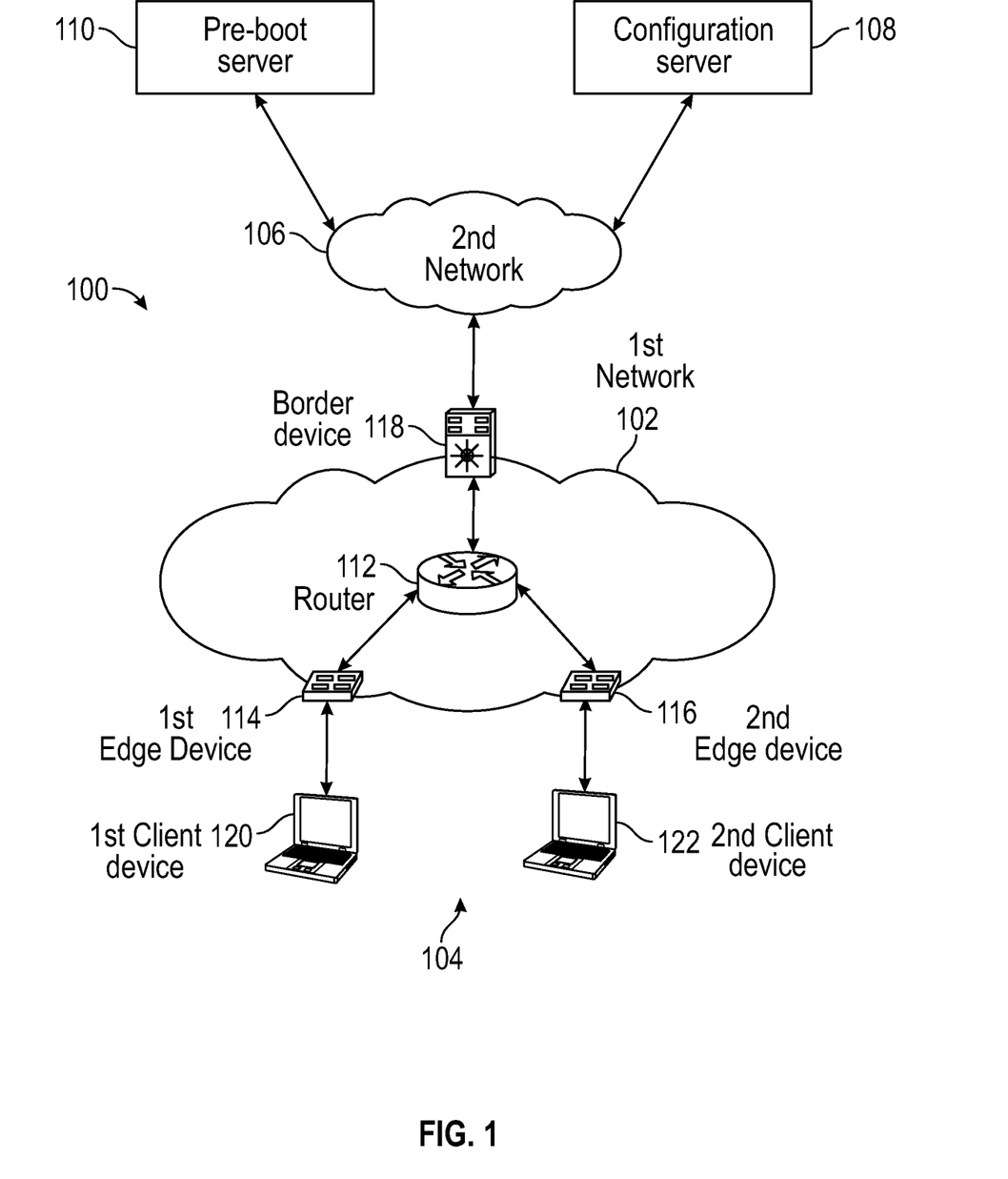
FIG. 1 is a block diagram of a network.

FIG. 1 shows a system 100 consistent with embodiments of the disclosure for providing boot server support in an enterprise fabric network. As shown in FIG. 1, system 100 may comprise a first network 102, a plurality of client devices 104, a second network 106, a configuration server 108, and a pre-boot server 110. First network 102 may comprise a plurality of network devices including, but not limited to, a router 112, a first edge device 114, a second edge device 116, intermediate network devices (not shown), and a border device 118. Plurality of client devices 104 may comprise a first client device 120 and a second client device 122. Second network 106 may comprise a network outside of first network 102, for example, the Internet. Configuration server 108 may comprise a Dynamic Host Configuration Protocol (DHCP) server for example and pre-boot server 110 may comprise a Pre-Boot Execution Environment (PXE) server for example.

The plurality of network devices in first network 102 may comprise, but are not limited to, switches and routers for example. First network 102 may comprise any number of network devices. Plurality of client devices 104 may comprise any number of client devices and is not limited to two. Each of plurality of client devices 104 may comprise any type device wishing to communicate over first network 102. For example, each of plurality of client devices 104 may comprise, but are not limited to, a Wi-Fi access point, a cellular base station, a tablet device, an Internet-of-Things (IoT) device, a mobile device, a smart phone, a telephone, a remote control device, a set-top box, a digital video recorder, a cable modem, a personal computer, a notebook computer, a network computer, a mainframe, a router, or other similar microcomputer-based device.

First network 102 may comprise a fabric network. The fabric network may comprise an underlay and an overlay. The underlay may deal with connectivity between fabric elements (e.g., network devices) and the overlay may deal with user traffic entering the fabric. Traffic may enter the fabric network (i.e., first network 102) through FE devices (e.g., first edge device 114 and second edge device 116). The traffic may be routed through first network 102 via a plurality of intermediate network devices within the plurality of network devices. The FE devices may be responsible for encapsulating a packet with a fabric header that contains an egress FE device address. When a packet (e.g., frame) arrives at the egress FE device, a fabric header may be stripped off and the native packet may be forwarded according to an inner address. The fabric network may be capable of providing Layer-2 and Layer-3 services on top of the underlay. The fabric network may have endpoints (e.g., plurality of client devices 104) connected to it.

The elements described above of system 100 (e.g., configuration server 108, pre-boot server 110, router 112, first edge device 114, second edge device 116, border device 118, first client device 120, and second client device 122) may be practiced in hardware and/or in software (including firmware, resident software, micro-code, etc.) or in any other circuits or systems. The elements of system 100 may be practiced in electrical circuits comprising discrete electronic elements, packaged or integrated electronic chips containing logic gates, a circuit utilizing a microprocessor, or on a single chip containing electronic elements or microprocessors. Furthermore, the elements of system 100 may also be practiced using other technologies capable of performing logical operations such as, for example, AND, OR, and NOT, including but not limited to, mechanical, optical, fluidic, and quantum technologies. As described in greater detail below with respect to FIG. 4, the elements of system 100 may be practiced in a computing device 400.

Figure 2:
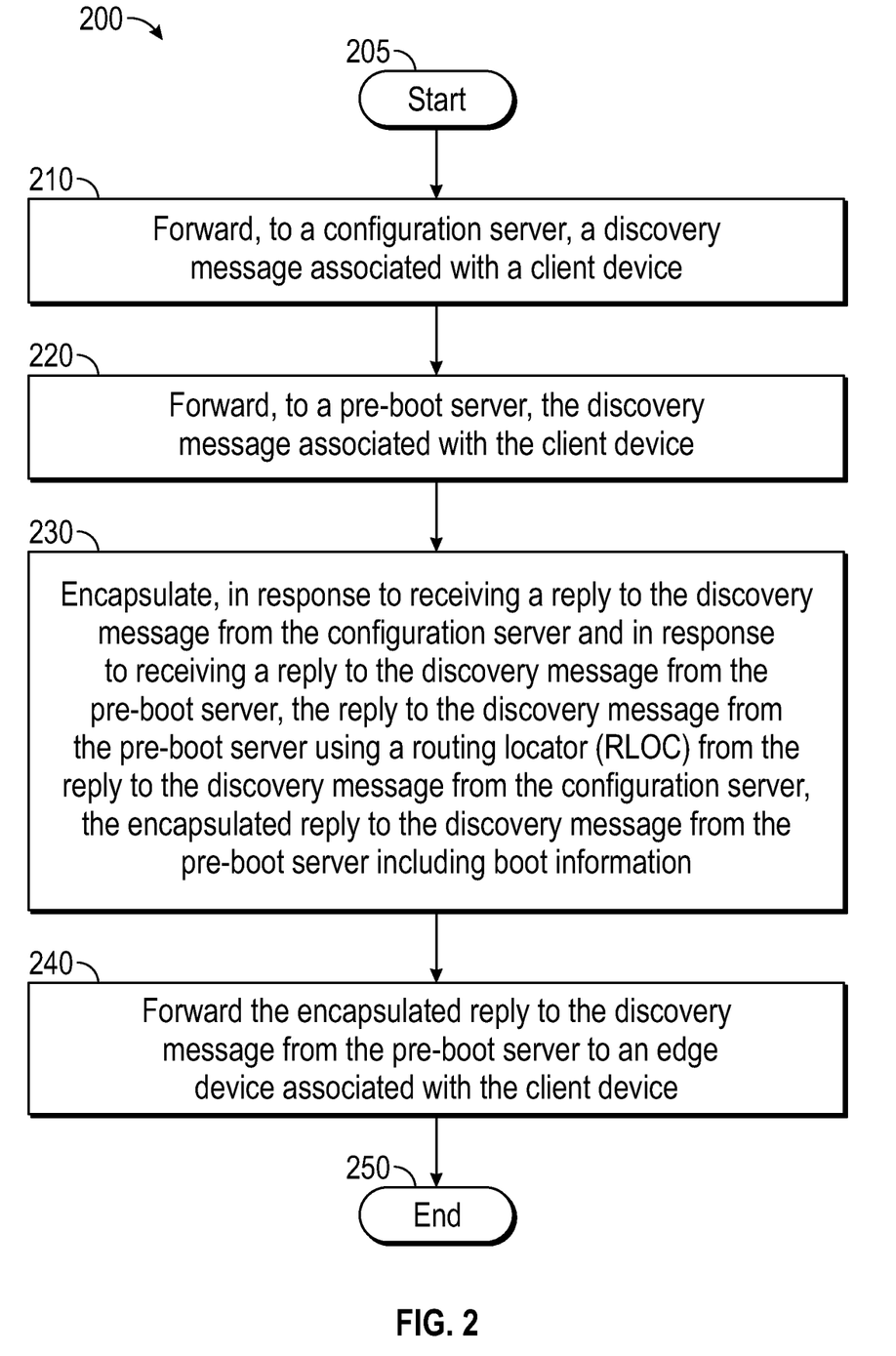
FIG. 2 is a flow chart of a method for providing boot server support in an enterprise fabric network.

FIG. 2 is a flow chart setting forth the general stages involved in a method 200 consistent with an embodiment of the invention for providing boot server support in an enterprise fabric network. Method 200 may be implemented using border device 118 as described in more detail below with respect to FIG. 1. Method 200 may be described in conjunction with flow diagram 300 of FIG. 3. Ways to implement the stages of method 200 will be described in greater detail below.

Method 200 may begin at starting block 205 and proceed to stage 210 where border device 118 may forward, to configuration server 108, a discovery message associated with a client device (e.g., first client device 120). For example, first edge device 114 may receive from first client device 120. The discovery message may include DHCP Option-60 information. When first client device 120 boots up (stage 302 of FIG. 3), it may look for both PXE boot and DHCP address information. At first edge device 114, both servers (i.e., configuration server 108 with Option-82 and pre-boot server 110) may be configured as helper addresses in first edge device 114 (stage 304 of FIG. 3).

Figure 3:
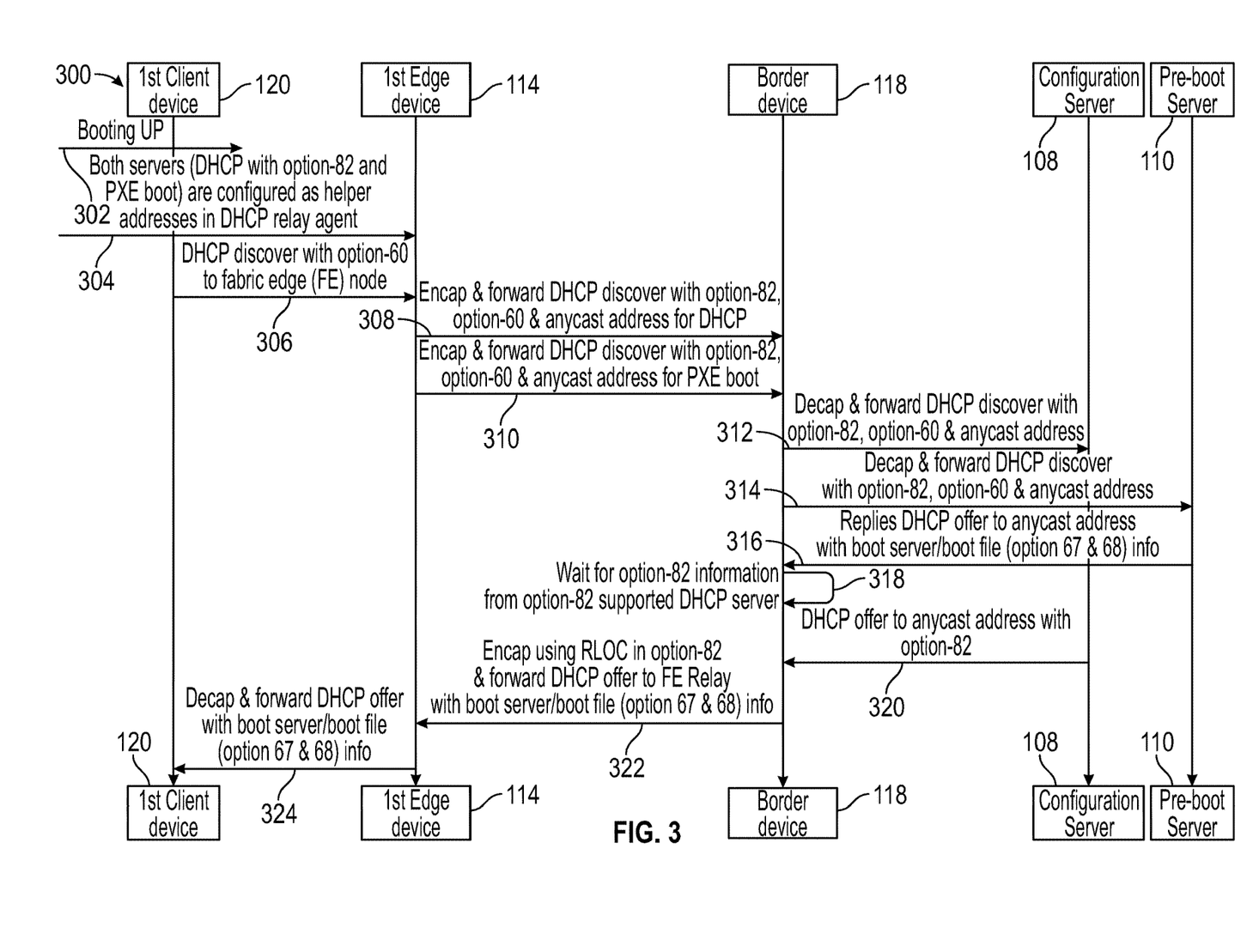
FIG. 3 is a flow diagram of a method for providing boot server support in an enterprise fabric network.

First client device 120 may send the discovery message (e.g., DHCP discover) with Option-60 to first edge device 114 (e.g., a Fabric Edge (FE) node DHCP Relay Agent) (stage 306 of FIG. 3). First edge device 114 may encapsulate and forward the DHCP discover with Option-82, Option-60, and an anycast address for configuration server 108 to border device 118 (stage 308 of FIG. 3). In addition, first edge device 114 may encapsulate and forward the DHCP discover with Option-82, Option-60, and an anycast address for PXE server 110 to border device 118 (stage 310 of FIG. 3). Border device 118 may decapsulate and forward the DHCP Discover with Option-82, Option-60, and the anycast address to configuration server 108 (stage 312 of FIG. 3).

From stage 210, where border device 118 forwards, to configuration server 108, the discovery message associated with the client device (e.g., first client device 120), method 200 may advance to stage 220 where border device 118 may forward, to pre-boot server 110, the discovery message associated with the client device (e.g., first client device 120). For example, border device 118 may decapsulate and forward the DHCP discover with Option-82, Option-60, and the anycast address to pre-boot server 110 (stage 314 of FIG. 3).

Once border device 118 forwards, to pre-boot server 110, the discovery message associated with the client device (e.g., first client device 120) in stage 220, method 200 may continue to stage 230 where border device 118 may encapsulate, in response to receiving a reply to the discovery message from configuration server 108 and in response to receiving a reply to the discovery message from pre-boot server 110, the reply to the discovery message from pre-boot server 110 using a Routing Locator (RLOC) from the reply to the discovery message from configuration server 108. The encapsulated the reply to the discovery message from pre-boot server 110 may include boot information. For example, pre-boot server 110 may reply with a DHCP offer to the anycast address with a boot server/boot file (i.e., Option-67 and Option-68) information to border device 118 (stage 316 of FIG. 3). Border device 118 may wait for Option-82 information from Option-82 supported configuration server 108 before forwarding PXE boot information (e.g., from pre-boot server 110) to first client device 120 (stage 318 of FIG. 3). When the wait is complete, configuration server 108 may send a DHCP offer to the anycast address with Option-82 to border device 118 (stage 320 of FIG. 3). Border device 118 may extract RLOC and VNI information from Option-82.

After border device 118 encapsulates, in response to receiving the reply to the discovery message from configuration server 108 and in response to receiving the reply to the discovery message from pre-boot server 110, the reply to the discovery message from pre-boot server 110 using the RLOC from the reply to the discovery message from configuration server 108 in stage 230, method 200 may proceed to stage 240 where border device 118 may forward the encapsulated reply to the discovery message from pre-boot server 110 to an edge device (e.g., first edge device 114) associated with the client device (e.g., first client device 120). For example, border device 118 may encapsulate using the RLOC and VNI in Option-82 and may forward the DHCP offer to first edge device 114 with boot server/boot file (i.e., Option-67 and Option-68) information (stage 322 of FIG. 3).

First edge device 114 may receive from border device 118, the encapsulated reply to the discovery message, decapsulate the encapsulated reply to the discovery message, and forward to the first client device 120, the decapsulated reply to the discovery message. In other words, first edge device 114 may decapsulate and forward the DHCP offer with boot server/boot file (i.e., Option-67 and Option-68) information to first client device 120 (stage 324 of FIG. 3). Thus first client device 120 may receive both DHCP and PXE boot information to complete its boot up and DHCP process. Once border device 118 forwards the encapsulated reply to the discovery message from pre-boot server 110 to the edge device (e.g., first edge device 114) associated with the client device (e.g., first client device 120) in stage 240, method 200 may then end at stage 250.

Figure 4:
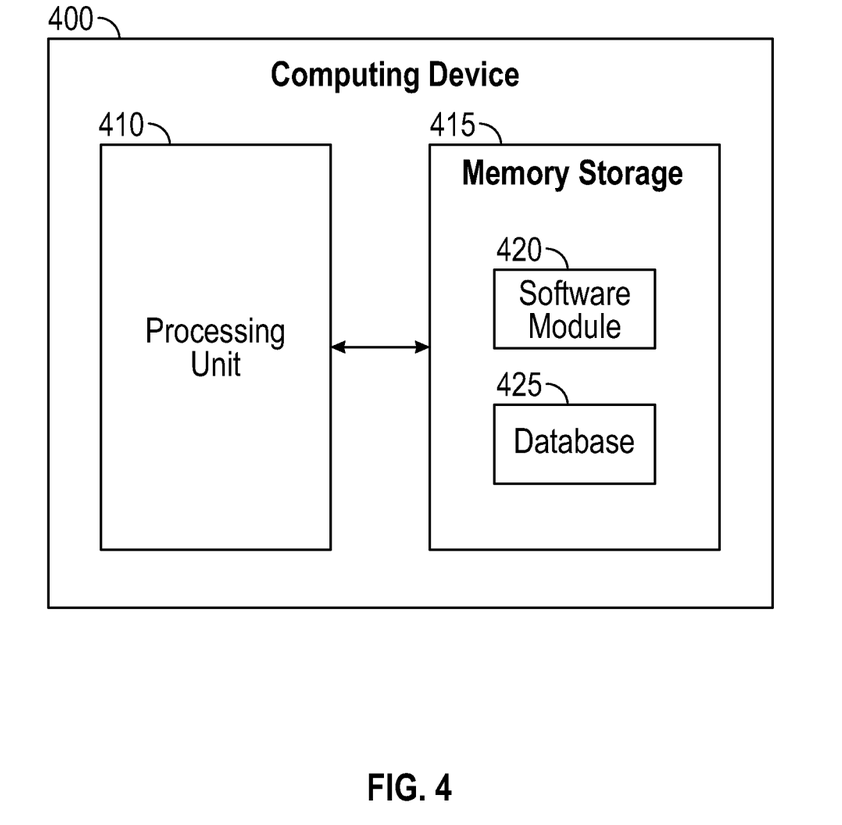
FIG. 4 is a block diagram of a computing device.

FIG. 4 shows computing device 400. As shown in FIG. 4, computing device 400 may include a processing unit 410 and a memory unit 415. Memory unit 415 may include a software module 420 and a database 425. While executing on processing unit 410, software module 420 may perform, for example, processes for providing boot server support in an enterprise fabric network as described above with respect to FIG. 2 and FIG. 3. Computing device 400, for example, may provide an operating environment for configuration server 108, pre-boot server 110, router 112, first edge device 114, second edge device 116, border device 118, first client device 120, or second client device 122. Configuration server 108, pre-boot server 110, router 112, first edge device 114, second edge device 116, border device 118, first client device 120, and second client device 122 may operate in other environments and are not limited to computing device 400.

Computing device 400 may be implemented using a Wi-Fi access point, a cellular base station, a tablet device, a mobile device, a smart phone, a telephone, a remote control device, a set-top box, a digital video recorder, a cable modem, a personal computer, a network computer, a mainframe, a router, a switch, a server cluster, a smart TV-like device, a network storage device, a network relay devices, or other similar microcomputer-based device. Computing device 400 may comprise any computer operating environment, such as hand-held devices, multiprocessor systems, microprocessor-based or programmable sender electronic devices, minicomputers, mainframe computers, and the like.

Computing device 400 may also be practiced in distributed computing environments where tasks are performed by remote processing devices. The aforementioned systems and devices are examples and computing device 400 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the element illustrated in FIG. 1 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 400 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:
    forwarding, by a border device to a configuration server, a discovery message associated with a client device;
    forwarding, by the border device to a pre-boot server, the discovery message associated with the client device;
    encapsulating, by the border device in response to receiving a reply to the discovery message from the configuration server and in response to receiving a reply to the discovery message from the pre-boot server, the reply to the discovery message from the pre-boot server using a Routing Locator (RLOC) from the reply to the discovery message from the configuration server, the encapsulated reply to the discovery message from the pre-boot server including boot information; and
    forwarding, by the border device, the encapsulated reply to the discovery message from the pre-boot server to an edge device associated with the client device.

2. The method of claim 1, further comprising:
    receiving, by the edge device from the client device, the discovery message including DHCP Option-60 information;
    encapsulating, by the edge device, the discovery message; and
    forwarding, by the edge device to the border device, the encapsulated discovery message.

3. The method of claim 1, further comprising:
    receiving, by the edge device from the border device, the encapsulated reply to the discovery message;
    decapsulating, by the edge device, the encapsulated reply to the discovery message; and
    forwarding, by the edge device to the client device, the decapsulated reply to the discovery message.

4. The method of claim 1, further comprising obtaining the RLOC from DHCP Option-82 information from the reply to the discovery message from the configuration server.

5. The method of claim 1, further comprising obtaining the boot information from at least one of DHCP Option-67 information and DHCP Option-68 information from the reply to the discovery message from the pre-boot server.

6. The method of claim 1, wherein the configuration server comprises a Dynamic Host Configuration Protocol (DHCP) server.

7. The method of claim 1, wherein the pre-boot server comprises a Pre-Boot Execution Environment (PXE) server.

8. A system comprising:
a first memory storage; and
a first processing unit disposed in a border device and coupled to the first memory storage, wherein the first processing unit is operative to:
forward a discovery message associated with a client device to a configuration server;
forward the discovery message associated with the client device to a pre-boot server;
encapsulate, in response to receiving a reply to the discovery message from the configuration server and in response to receiving a reply to the discovery message from the pre-boot server, the reply to the discovery message from the pre-boot server using a Routing Locator (RLOC) from the reply to the discovery message from the configuration server, the encapsulated reply to the discovery message from the pre-boot server including boot information; and
forward the encapsulated reply to the discovery message from the pre-boot server to an edge device associated with the client device.

9. The system of claim 8, further comprising:
a second memory storage; and
a second processing unit disposed in the edge device and coupled to the second memory storage, wherein the second processing unit is operative to:
receive, from the client device, the discovery message including DHCP Option-60 information;
encapsulate the discovery message; and
forward, to the border device, the encapsulated discovery message.

10. The system of claim 8, further comprising:
a second memory storage; and
a second processing unit disposed in the edge device and coupled to the second memory storage, wherein the second processing unit is operative to:
receive, from the border device, the encapsulated reply to the discovery message;
decapsulate the encapsulated reply to the discovery message; and
forward, to the client device, the decapsulated reply to the discovery message.

11. The system of claim 8, wherein the first processing unit is further operative to obtain the RLOC from DHCP Option-82 information from the reply to the discovery message from the configuration server.

12. The system of claim 8, wherein the first processing unit is further operative to obtain the boot information from at least one of DHCP Option-67 information and DHCP Option-68 information from the reply to the discovery message from the pre-boot server.

13. The system of claim 8, wherein the configuration server comprises a Dynamic Host Configuration Protocol (DHCP) server.

14. The system of claim 8, wherein the pre-boot server comprises a Pre-Boot Execution Environment (PXE) server.

15. A non-transitory computer-readable medium that stores a set of instructions which when executed perform a method executed by the set of instructions comprising:
forwarding, by a border device to a configuration server, a discovery message associated with a client device;
forwarding, by the border device to a pre-boot server, the discovery message associated with the client device;
encapsulating, by the border device in response to receiving a reply to the discovery message from the configuration server and in response to receiving a reply to the discovery message from the pre-boot server, the reply to the discovery message from the pre-boot server using a Routing Locator (RLOC) from the reply to the discovery message from the configuration server, the encapsulated reply to the discovery message from the pre-boot server including boot information; and
forwarding, by the border device, the encapsulated reply to the discovery message from the pre-boot server to an edge device associated with the client device.

16. The non-transitory computer-readable medium of claim 15, further comprising:
receiving, by the edge device from the border device, the encapsulated reply to the discovery message;
decapsulating, by the edge device, the encapsulated reply to the discovery message; and
forwarding, by the edge device to the client device, the decapsulated reply to the discovery message.

17. The non-transitory computer-readable medium of claim 15, further comprising obtaining the RLOC from DHCP Option-82 information from the reply to the discovery message from the configuration server.

18. The non-transitory computer-readable medium of claim 15, further comprising obtaining the boot information from at least one of DHCP Option-67 information and DHCP Option-68 information from the reply to the discovery message from the pre-boot server.

19. The non-transitory computer-readable medium of claim 15, wherein the configuration server comprises a Dynamic Host Configuration Protocol (DHCP) server.

20. The non-transitory computer-readable medium of claim 15, wherein the pre-boot server comprises a Pre-Boot Execution Environment (PXE) server.

* * * * *